Oct. 31, 1944.     E. J. CARTIER     2,361,819

PISTON

Filed Dec. 21, 1943

Inventor
Edward Joseph Cartier

Patented Oct. 31, 1944

2,361,819

UNITED STATES PATENT OFFICE 2,361,819

PISTON

Edward Joseph Cartier, Toronto, Ontario, Canada, assignor of one-half to William Conley, Toronto, Ontario, Canada Application December 21, 1943, Serial No. 515,099
In Canada August 20, 1943

13 Claims. (Cl. 309—4)

This invention relates to pistons suitable for internal combustion engines and the like, and consists in the novel construction of the piston, and combination of its elements herein described and claimed.

Pistons are now made to reciprocate in sealing contact with cylinder walls, and are provided with piston rings with the object of maintaining such sealing contact, but because of heat generated by kinetic forces, by the high thermal conductivity of metal used in engine construction, and because of ring friction, the resilient qualities of piston rings are partially lost, with a resultant loss of compression, and auxiliary rings of spring steel are used in combination with conventional piston rings to increase piston ring efficiency and life; it is however a fact of experience that piston rings must be renewed at comparatively short intervals.

The idea embodied in this invention is to provide a piston having novel sealing elements adapted to function in response to cyclical pressures generated above the piston thereby contributing to extended wear in the use of the compression ring element, moreover; obviating the necessity of depending entirely upon the resilient characteristics of the metal used in compression rings to complete their function, or resort to the use of auxiliary springs to augment such characteristics.

It is a fundamental object of the invention to provide novel means for exerting balanced universal expansion of a compression ring against a cylinder wall during the reciprocating action of the piston, thereby permitting uniform attrition on the opposed sealing surfaces.

Another object of the invention is to provide means for preventing loss of pressure gases outwardly from the ring groove of the piston.

A further object of the invention is to provide means for regulating the effective pressure of the compression ring on the cylinder wall induced by the reciprocating action of the piston and the expansion of gases in the cylinder.

Other objects and a fuller understanding of my invention may be had by reference to the following description and claims taken in conjunction with the accompanying drawing in which like parts are designated by like reference characters and in which:

Figure 1:
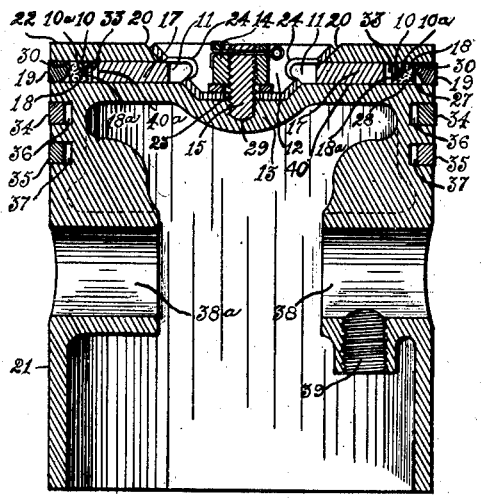
Figure 1 shows a sectional view of the piston on the line 4—4 of Figure 4 constructed in accordance with the invention.

In the drawing, 21 is the piston body which is of a selected cast metal, 22 is the head portion of the piston, 38—38A are conventional wrist pin bosses, 39 is a boss threaded to receive a wrist pin retaining set screw, 36 and 37 are piston ring grooves containing ordinary piston rings 34 and 35 respectively; adapted to maintain vertical balance of the piston and to act as suction elements during the intake stroke of the piston.

Figure 2:
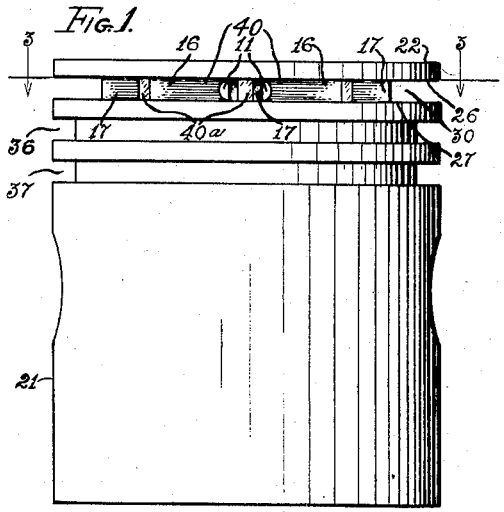
Figure 2 shows a side elevation of the piston constructed in accordance with the invention.
Figure 3:
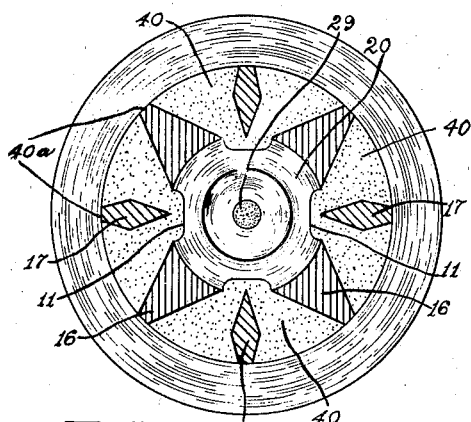
Figure 3 shows a transverse section on the line 3—3 Figure 2.
Figure 5:
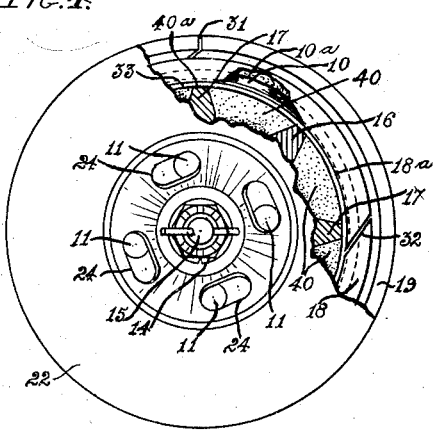
Figure 5 shows a plan view of the top portion of the piston with valve member apertures in partially closed registry with valve seat apertures and a broken away section showing ring elements in relative position.
Figure 6:
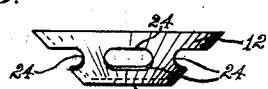
Figure 6 shows a side elevation of the valve member.

Somewhat similar construction as that recited in the preceding paragraph, is primarily employed in most modern pistons and is also necessary to embody the improvements which characterize my invention, a detailed description of which is as follows:

Referring to Figure 1, the head portion 22 is provided with a valve seat 20, the valve seat 20 is provided with apertures 11 leading into passages 40—as shown particularly in Figure 3, and Figure 5—the passages 40 are in open communication with the ring groove 30. The first land 26 is rigidly supported by bridge portions 16 and 17, which also form the walls 40A of the passages 40; the said walls extending vertically between the first land 26 and the second land 27—as illustrated in Figure 2.

The valve member 12 is provided with apertures 24 adapted to register with apertures 11 in the valve seat 20, and said valve member is also provided with an axially located aperture 23 whereby said valve member may be assembled for rotatable adjustment in the valve seat 20 in close fitting relation with stud 15 which is disposed in threaded hole 29 in the reinforced portion 13; the valve member 12 may be locked firmly in the valve seat 20 by the castellated nut, lock washer, and cotter pin assembly 14.

Figure 4:
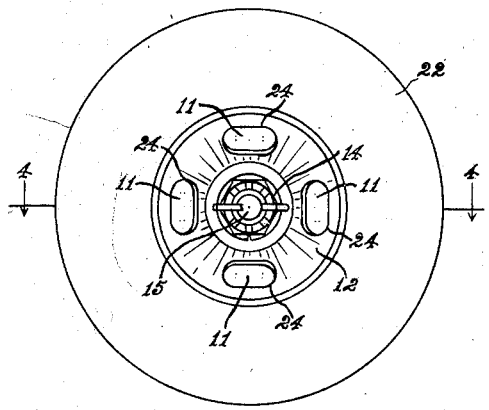
Figure 4 shows a plan view of the top portion of the piston with valve member apertures in open registry with valve seat apertures.

(Attention is particularly invited to Figure 4 wherein valve member 12 is shown with apertures 24 in open registry with apertures 11, and to Figure 5 wherein valve member 12 is shown with apertures 24 in partially open registry with apertures 11.)

Figure 7:
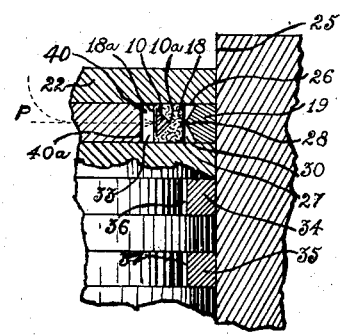
Figure 7 shows an oversize fragmentary broken away and sectional view of the piston with ring elements and a fragmentary section of a cylinder wall.

Positioned in ring groove 30 is an obturator ring 18 of yieldable material provided with a metal thew ring 10 embedded therein; cross section views of said thew ring are shown in Figure 1 and Figure 7, provided with an apex 10A presented outwardly. Closely surrounding obturator ring 18 is a metal compression ring 19 with an apexed inner peripheral surface 28 presented inwardly. A plan view of the thew ring 10 with its apexed periphery 10A is exposed in the broken away section of the obturator ring 18 in Figure 5. A further illustration pertinent to the novelty of my invention is shown in the fragmentary broken away view in Figure 5, wherein the obturator ring 18 is provided with a split 32 and compression ring 19 is provided with a split 31, 18A designates the inner peripheral surface of obturator ring 18 and an outer terminal point of vertical walls 40A is shown with a space 33 oppositely positioned between 18A and 40A.

For effective operation of my invention, the obturator ring 18 and the compression ring 19 are positioned as shown in ring groove 30, the valve member 12 is locked in valve seat 20—using assembly 14—with apertures 24 in the valve member 12 in suitable open registry with apertures 11 in valve seat 20; the said registry being determined by the known unit pressure required of the compression ring against the cylinder wall of the engine.

It will be noted that when pressure is generated above the piston, pressure gases will be admitted through apertures 24 and 11 into passages 40, the line of force being indicated approximately by the curved dotted line P in the fragmentary illustration Figure 7, the said pressure gases will expand in passages 40—shown particularly in Figure 3 and Figure 5—and impinge on the inner periphery 18A of obturator ring 18 transmitting the force to the compression ring 19 at the apex 28 thereby urging said compression ring radially outwardly into sealing engagement with cylinder wall 25; the resisting force of the cylinder wall 25 simultaneously reacting through apex 28 toward apex 10A on thew ring 10 which is adjacent to the first point of resistance 18A, thus vertically expanding the relatively soft element of obturator ring 18 upwardly toward the first land surface 26, and downwardly toward the second land surface 27 thereby preventing loss of pressure gases outwardly through ring groove 30 during the pressure period.

It should be further noted. Firstly, that the passages 40 are widely spacious to permit easy removal of carbon. Secondly, provision has been made for universal expansion of pressure gases against the inner periphery 18A of obturator ring 18 by allowing common intercommunication between the passages 40 through spaces 33 existing between 18A and 40A. Thirdly, that at least one pair of apertures—11 in valve seat 20, and 24 in valve member 12 when adjusted as shown—are capable of admitting pressure gases to universally impinge on the inner periphery 18A of obturator ring 18; this novel construction being a functional security where an accumulation of carbon has been allowed to increase on top of the piston.

It will be appreciated from a survey of the foregoing disclosure that I have provided means for effectually preventing loss of combustion gases from above the piston during the pressure periods, and that this result has been accomplished without the use of springs, or the limitation of using an ordinary cast iron or steel compression ring in the described main compression ring groove, on the contrary the compression ring for this groove may be devoid of resilient characteristics and it will nevertheless function effectively; this novel feature of the described invention is a contribution to the development and use of self lubricating metals now known in the combustion engine art.

Although the gas engine is oppositely used as a functional media to describe my invention, it will be appreciated that modifications may be made in my improved piston making it suitable for effective operation in various engines used for the production of power; without deviating from the spirit of my invention or the intention embodied in the attached claims which are as follows.

I claim:

1. A piston comprising, in combination, a head, a skirt with wrist pin bosses, a valve seat in said head having a plurality of apertures therein leading into passages universally incorporated with an annular groove adapted for receiving a metal compression ring, said ring adapted for contiguously surrounding an obturator ring having a body element of yieldable material, said passages adapted for conducting pressure gases generated above said piston for universal impingement against the inner periphery of said obturator ring, metering means in said seat for regulating said pressure gases admitted into said passages.

2. A piston comprising, in combination, a head, a skirt with wrist pin bosses, means for simultaneously effecting a regulated pressure of a compression ring against a cylinder wall and expanding an obturator ring having a body element of yieldable material against the walls of an annular groove containing said compression ring and said obturator ring comprising, an axial valve seat in said head having a plurality of apertures disposed therein, an apertured valve member rotatably mounted in said valve seat adapted for selective registry with said apertures, means associated with said valve seat for locking said member, at least one unit of said registry capable of admitting pressure generated above said piston into intercommunicating passages originating from said apertures, said passages incorporated with a circumferential portion of said groove disposed rearwardly of said obturator ring.

3. A piston comprising, in combination, a head, a skirt wtih wrist pin bosses, an annular groove containing a metal compression ring contiguously surrounding an obturator ring having a body element of yieldable material capable of vertical expansion when subjected to gas pressure within said groove whereby said element is impelled against said compression ring thereby impelling said compression ring against a cylinder wall, means for controllably admitting said gas pressure through means provided in said head comprising an axial valve seat having an apertured valve member rotatably mounted therein, means associated with said valve seat for locking said member, a plurality of apertures in said valve seat leading into inter-communicating passages incorporated with said groove, at least one of said apertures capable of admitting said gas pressure to universally expand said element.

4. A piston comprising, in combination, a head, a skirt with wrist pin bosses, an annular groove containing a metal compression ring, means for preventing loss of pressure gas outwardly from said groove comprising an obturator ring having a yieldable body element, said element contiguously aligned with the inner periphery of said compression ring, means for conducting pressure generated above said piston into a circumferential portion of said groove to cause universal expansion of said element thereby to impel said compression ring against a cylinder wall comprising a plurality of passages radiating inwardly from said groove to apertures in an axially disposed valve seat in said head, means for regulating said pressure on said obturator element comprising an apertured valve member mounted in said valve seat, means associated with said valve seat for locking said member in selective registry with first said apertures.

5. A piston comprising, in combination, a head, a skirt with wrist pin bosses, means for exerting a regulated universal attritional urgency of a compression ring against a cylinder wall during the reciprocating action of said piston comprising an annular groove containing said compression ring, said ring contiguously surrounding an obturator ring having a body element of yieldable material, an axial valve seat in said head having a plurality of apertures therein leading into passages intercommunicating with a circumferential portion of said groove adapted to conduct cyclical pressures generated above said piston thereinto thereby to expand said obturator ring against said compression ring an apertured valve member in said valve seat adapted for adjustable registry with said apertures, means associated with said valve seat to lock said member, at least one unit of such registry capable of admitting said pressures into said circumferential portion.

6. A piston comprising, in combination, a head, a skirt with wrist pin bosses, an axial valve seat in said head having an upwardly projecting stud centrically positioned therein, an annular groove containing a split obturator ring having a generally concentric body element of yieldable material provided with a split metal thew ring imbedded therein disposed with its greatest peripheral dimension converging outwardly, a split metal compression ring contiguously surrounding said obturator ring, means for controllably utilizing the pressure generated above said piston for imparting a greater or less attritional urgency of said compression ring against a cylinder wall comprising a plurality of apertures in said valve seat leading into passages incorporated with said groove, an apertured valve member rotatably mounted in said valve seat adapted to regulate volumes of said pressure passing into said passages, means associated with said valve seat for adjustably locking said member.

7. A piston comprising, in combination, a head, a skirt with wrist pin bosses, an axial valve seat in said head having an upwardly projecting stud centrically positioned therein, an annular groove containing a split obturator ring having a generally concentric body element of yieldable material, a split metal compression ring contiguously surrounding said obturator ring, means for utilizing the cyclical pressure generated above said piston for imparting a greater or less attritional urgency of said compression ring against a cylinder wall while effecting obturation of said groove comprising a plurality of apertures in said valve seat leading into passages of progressively outwardly increasing area incorporated with said groove adapted to impinge said pressure on said obturator ring thereby impelling said compression ring into contact with said cylinder wall whereby tending to expand said element vertically, an apertured valve member disposed in said valve seat adapted to regulate admission of pressure gases into said passages, means associated with said valve seat for locking said member.

8. The combination with a combustion engine provided with one or more cylinders, of a piston having means for controllably admitting pressure gases through communicating means provided in the head of said piston comprising an axial valve seat having an apertured valve member rotatably mounted therein, means associated with said valve seat for locking said member, a plurality of apertures in said valve seat leading into intercommunicating passages incorporated with an annular groove adapted to universally expand said gases thereinto, said groove containing an obturator ring having a body element of yieldable material containing a metal ring provided with an outwardly converging periphery, a metal compression ring contiguously surrounding said element having an inwardly converging periphery whereby said pressure exerted on the inner periphery of said obturator ring will impel said compression ring against a cylinder wall thereby vertically expanding said element between said converging means, at least one of said apertures capable of admitting said pressure into said passages.

9. The combination with a combustion engine provided with one or more cylinders, of a piston having means for controllably admitting pressure gases through communication means provided in the head of said piston thereby regulating the attritional force of a split metal compression ring against a cylinder wall comprising an axial valve seat in said head, an apertured valve member rotatably mounted therein, means associated with said valve seat for adjustably locking said member, a plurality of apertures in said valve seat leading into intercommunicating passages incorporated with an annular groove containing said compression ring, means for preventing loss of said pressure gases outwardly from said groove comprising a split obturator ring having a body element of yieldable material disposed in said groove contiguously aligned with the inner periphery of said compression ring whereby pressure admitted through first said means will universally impel said compression ring against said cylinder wall and tend to vertically expand said element against the upper and lower walls of said groove.

10. A piston comprising, in combination, a head, a skirt with wrist pin bosses, an axial valve seat in said head having an upwardly projecting stud centrically positioned therein, an annular groove containing a split obturator ring having a generally concentric body element of yieldable material provided with a split metal thew ring circumferentially imbedded therein disposed with its greatest peripheral dimension converging outwardly, a split metal compression ring contiguously surrounding said obturator ring, means for utilizing cyclical pressure generated above said piston for imparting a greater or less attritional urgency of said compression ring against a cylinder wall comprising a plurality of apertures in said valve seat, at least one of such capable of conveying said pressure into intercommunicating passages incorporated with said groove whereby to universally impinge said pressure against said obturator ring thereby to impel said compression ring outwardly, an apertured valve member rotatably mounted in said valve seat adapted to regulate admission of said pressure into said passages, means associated with said valve seat for locking said member in selective registry with said plurality of apertures.

11. The combination with a combustion engine provided with one or more cylinders, of a piston having means for utilizing cyclical pressure generated above said piston for imparting a greater or less attritional urgency of a compression ring against a cylinder wall while coactively preventing loss of said pressure outwardly from an annular groove containing said ring comprising a split metal compression ring in said groove having an inwardly converging inner periphery contiguously surrounding a split obturator ring having a generally concentric body element of yieldable material containing a split metal thew ring circumferentially imbedded therein and disposed with its greatest peripheral dimension converging outwardly, an axially disposed valve seat in the top surface of said piston having a plurality of apertures leading into passages incorporated with said groove whereby to impinge said pressure on the inner periphery of said obturator ring thereby to impel said compression ring against said cylinder wall causing vertical expansion of said element between converging means on said thew ring and converging means on said compression ring, an apertured valve member disposed in said valve seat, means associated with said valve seat for locking said member in selected registry with said plurality of apertures.

12. A piston comprising, in combination, a head, a skirt with wrist pin bosses, an axial valve seat in said head having an upwardly projecting stud centrically positioned therein, an annular groove containing a split obturator ring having a body element of yieldable material provided with a split metal thew ring circumferentially imbedded therein disposed with its greatest peripheral dimension converging outwardly, a split metal compression ring contiguously surrounding said obturator ring, means for controllably utilizing pressure generated above said piston for imparting a greater or less attritional urgency of said compression ring against a cylinder wall while effecting obturation of said groove comprising a plurality of apertures in said valve seat opening into passages defined by vertical and horizontal walls, pairs of said vertical walls converging outwardly and cojoining adjacent to said groove, said horizontal walls cojoining with walls of said groove whereby said pressure may be universally applied on the inner periphery of said obturator ring to impel said compression ring against said cylinder wall thereby vertically expanding said element against the opposed walls of said groove, an apertured valve member mounted in said valve seat adapted to regulate pressure admitted into said passages, means associated with said valve seat for adjustably locking said member.

13. The combination with an internal combustion engine provided with one or more cylinders, including piston reciprocating means, of a piston having a head and a skirt with wrist pin bosses, means for utilizing the cyclical pressure generated above said piston for imparting a greater or less attritional urgency of a compression ring against a cylinder wall comprising an annular groove containing a split obturator ring having a body element of yieldable material, a split metal compression ring contiguously surrounding said obturator ring, an axial valve seat in said head having a plurality of apertures leading into intercommunicating passages incorporated with said groove interiorly of said obturator ring, an apertured valve member disposed in said valve seat adapted to regulate pressure admitted to said passages, means associated with said valve seat for locking said member in selected registry with said plurality of apertures, means for preventing loss of said pressure outwardly from said groove comprising a split metal thew ring circumferentially imbedded in said body element disposed with its greatest peripheral dimension converging outwardly whereby said pressure exerted on the inner periphery of said body element will tend to vertical expansion of the same between said thew ring and the resistant force of said cylinder wall reacting through said compression ring.

EDWARD JOSEPH CARTIER.